US009622165B2

(12) United States Patent
Mu

(10) Patent No.: US 9,622,165 B2
(45) Date of Patent: Apr. 11, 2017

(54) METHODS AND SYSTEMS FOR CONNECTING A MOBILE DEVICE TO A NETWORK

(71) Applicant: TENCENT TECHNOLOGY (SHENZHEN) COMPANY LIMITED, Shenzhen (CN)

(72) Inventor: Yikun Mu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 386 days.

(21) Appl. No.: 14/246,545

(22) Filed: Apr. 7, 2014

(65) Prior Publication Data
US 2014/0330970 A1 Nov. 6, 2014

Related U.S. Application Data

(63) Continuation of application No. PCT/CN2013/090006, filed on Dec. 19, 2013.

(30) Foreign Application Priority Data

May 6, 2013 (CN) .......................... 2013 1 0163091

(51) Int. Cl.
H04L 12/911 (2013.01)
H04W 12/06 (2009.01)
H04W 48/20 (2009.01)
H04W 48/16 (2009.01)

(52) U.S. Cl.
CPC ............ H04W 48/20 (2013.01); H04W 48/16 (2013.01)

(58) Field of Classification Search
USPC ................................... 709/224, 225
See application file for complete search history.

(56) References Cited

U.S. PATENT DOCUMENTS 8,155,081 B1* 4/2012 Mater ..................... H04W 4/04
370/254
8,570,993 B2* 10/2013 Austin .................... H04W 4/02
370/338
9,331,859 B2* 5/2016 Martinsen ........... H04L 12/1818
(Continued)

FOREIGN PATENT DOCUMENTS

CN 1981545 A 6/2007
CN 101431786 A 5/2009
CN 102148876 A 8/2011

OTHER PUBLICATIONS

The World Intellectual Property Organization (WIPO) International Search Report for PCT/CN2013/090006 Mar. 27, 2014.

Primary Examiner — Jude Jean Gilles
(74) Attorney, Agent, or Firm — Anova Law Group, PLLC

(57) ABSTRACT

A method and system for obtaining network access modes of mobile devices are disclosed. An exemplary method may include obtaining network connection information once a mobile device connects to a network and obtaining network access point information from the network connection information. In addition, the method includes determining a network access mode corresponding to the network access point information. The method and system consistent with the present disclosure may improve the accuracy for identifying network access modes of mobile devices.

15 Claims, 4 Drawing Sheets

(56) References Cited

U.S. PATENT DOCUMENTS

| | | | |
|---|---|---|---|
| 2007/0008925 A1* | 1/2007 | Dravida | H04W 36/30 370/331 |
| 2007/0010248 A1* | 1/2007 | Dravida | H04W 60/00 455/435.1 |
| 2007/0010261 A1* | 1/2007 | Dravida | G01S 5/0009 455/456.3 |
| 2011/0151886 A1* | 6/2011 | Grayson | H04W 16/04 455/452.1 |
| 2013/0083661 A1* | 4/2013 | Gupta | H04W 4/005 370/235 |
| 2013/0084889 A1* | 4/2013 | Schmitt | G01S 1/68 455/456.1 |
| 2014/0043979 A1* | 2/2014 | Etemad | H04B 7/2656 370/237 |

* cited by examiner

METHODS AND SYSTEMS FOR CONNECTING A MOBILE DEVICE TO A NETWORK

CROSS-REFERENCES TO RELATED APPLICATIONS

Related Applications

This application is a continuation application of PCT Patent Application No. PCT/CN2013/090006, filed on Dec. 19, 2013, which is based upon and claims the benefit of priority from Chinese Patent Application No. 201310163091.6, filed on May 6, 2013, the entire contents of all of which are incorporated herein by reference.

FIELD OF THE INVENTION

The present disclosure relates to mobile Internet technologies and, more particularly, to methods and systems for connecting a mobile device to a network.

BACKGROUND

In order to provide better services to users, a network provider may often need to check the network access modes of the users. The network access mode may refer to the way a device is connected to a network, such as through a 2G network or a 3G network by a specific network service provider. In one example, a network service provider may issue mainly text based webpages to 2G users because these pages consume less network resources than pages with more graphics. The network service provider may also issue webpages with more graphics to 3G or Wi-Fi users.

A mobile device may connect to the Internet using 2G/2.5G, 3G, or Wi-Fi/Wlan connections. Often, a network service provider may use the Access Point Names ("APN") of the mobile devices to connect them to the Internet. The APN, however, could be manually changed by unauthorized persons. In addition, a network service provider may also have difficulty obtaining the APNs from certain devices, such as certain iOS devices. As such, the network service provider may have a high error rate in determining the network access modes of mobile devices.

The disclosed method and system are directed to solve one or more problems set forth above and other problems.

BRIEF SUMMARY OF THE DISCLOSURE

Embodiments consistent with the present disclosure provide a method, system, mobile device, or a server for obtaining network access modes of mobile devices. Embodiments consistent with the present disclosure improve the accuracy of the network access mode identification process.

One aspect of the present disclosure provides a method for obtaining network access modes of mobile devices. An exemplary method includes obtaining network connection information once a mobile device connects to a network and obtaining network access point information from the network connection information. In addition, the method includes determining a network access mode corresponding to the network access point information. The method and system consistent with the present disclosure may improve the accuracy in identifying network access modes for mobile devices.

Another aspect of the present disclosure provides a system for obtaining a network access mode of a mobile device. The system includes a network connection information obtaining module configured to obtain network connection information once a mobile device connects to network; a network access point information obtaining module configured to obtain network access point information from the network connection information; and a network access mode obtaining module configured to determine a network access mode corresponding to the network access point information.

Another aspect of the present disclosure provides a method for obtaining network access mode of a mobile device. The method includes obtaining network connection information once a mobile device connects to network and obtaining network access point information from the network connection information. The method further includes obtaining a wireless gateway IP address from the network connection information; and determining a network access mode corresponding to the network access point information and the wireless gateway IP address.

Embodiments consistent with the present disclosure may obtain a network access mode from data related to a network connection and match the network access mode with data related to a mobile device's current network connection, and therefore improve the accuracy in determining the network access mode of the mobile device. In addition, if the network access mode cannot be obtained from the network connection, embodiments consistent with the present disclosure may use a gateway IP address to help determine the network access mode, and therefore, improve the accuracy in determining the network access mode of the mobile device.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, a mobile device, a terminal device, a user terminal, and a terminal are used interchangeably to refer to any computing device that may communicate with another computing device. Exemplary mobile devices may include a Laptop Computer, a smartphone, a tablet computer, etc. The network access mode may refer to the way a mobile device connects to a network, such as the Internet. For example, the network access mode may be an identification of the wireless network to which the mobile device has access.

Figure 7:
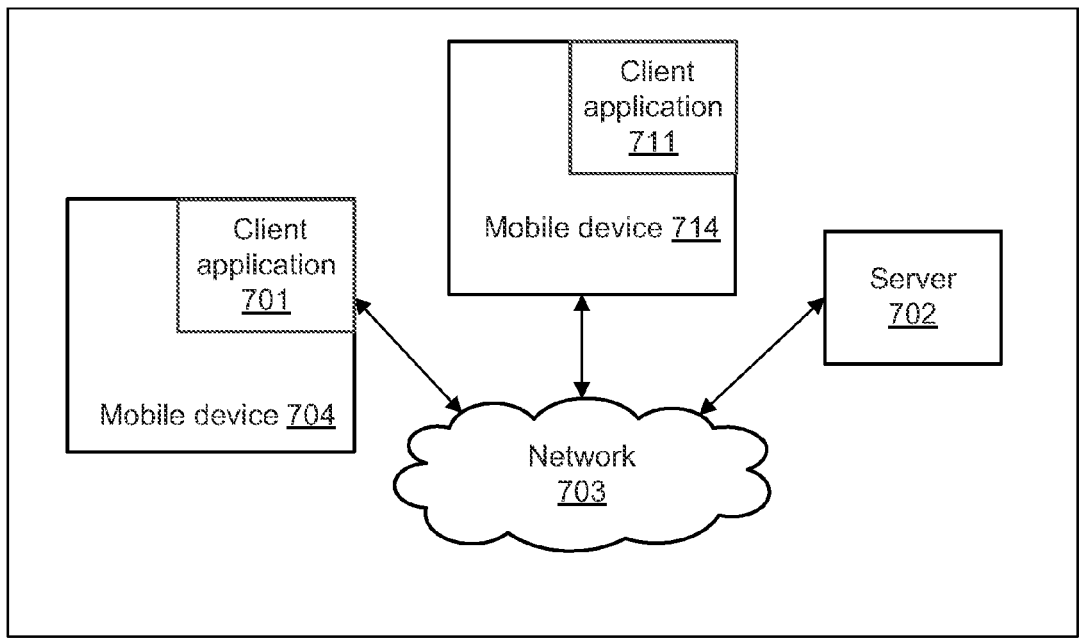
FIG. 7 illustrates an exemplary operating environment incorporating certain disclosed embodiments.

FIG. 7 illustrates an exemplary online computer environment 700 incorporating certain disclosed embodiments. As shown in FIG. 7, environment 700 may include mobile devices 704 and 714, a network 703, and a server 702. The network 703 may include any appropriate type of communication network for providing network connections to the mobile devices 704 and 714, and the server 702. For example, network 703 may include the Internet, LAN (Local Area Network), or other types of computer networks or telecommunication networks, either wired or wireless.

A server 702, as used herein, may refer to one or more server computers configured to provide certain functionalities, which may require any user accessing the services to authenticate to the server before the access. A server 702 may also include one or more processors to execute computer programs in parallel. The server 702 may include any appropriate server computers configured to provide certain server functionalities, such as storing or processing data related to network access modes of various mobile devices. Although only one server is shown, any number of servers can be included. The server 702 may operate in a cloud or non-cloud computing environment.

Mobile devices 704 and 714 may include any appropriate type of network computing devices, such as PCs, tablets, smartphones, etc. Mobile devices 704 and 714 may include one or more client applications 701 and 711. The client applications 701 and 711, as used herein, may include any appropriate software application, hardware application, or a combination thereof to achieve certain client functionalities, such as browsing a Webpage online. For example, client applications 701 and 711 may be the internet explorer application, which may access online shopping websites such as Amazon.com. Any number of client applications 701 and 711 may be included in the environment 700.

Figure 8:
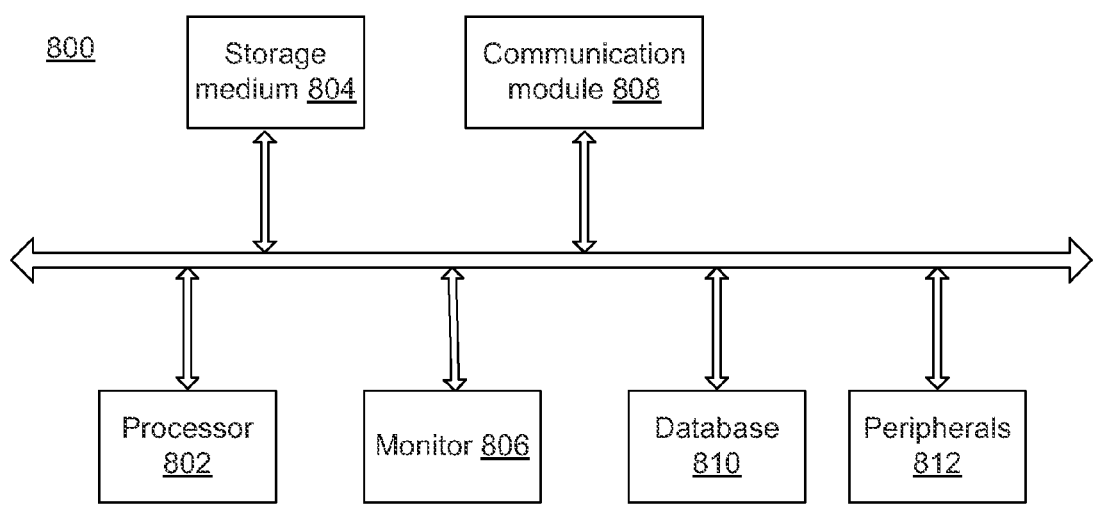
FIG. 8 illustrates a block diagram of an exemplary computer system consistent with the disclosed embodiments.

Mobile devices 704/714 and server 702 may be implemented on any appropriate computing platform. FIG. 8 illustrates a block diagram of an exemplary computer system 800 capable of implementing mobile devices 704/714 and server 702.

As shown in FIG. 8, computer system 800 may include a processor 802, storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as Read-only memory (ROM), Random Access Memory (RAM), flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as keyboard and mouse, and communication module 808 may include network devices for establishing connections through the communication network. Database 810 may include one or more databases for storing certain data and for performing certain operations on the stored data, such as database searching.

In operation, the server 702 may obtain data related to network access modes for mobile devices 704/714. Embodiments consistent with the present disclosure may obtain a network access mode from data related to a network connection and match the network access mode with data related to a mobile device's current network connection, and therefore improve the accuracy in determining the network access mode of the mobile device. In addition, if the network access mode cannot be obtained from the network connection, embodiments consistent with the present disclosure may use a gateway IP address to help determine the network access mode, and therefore, improve the accuracy in determining the network access mode of the mobile device.

Figure 1:
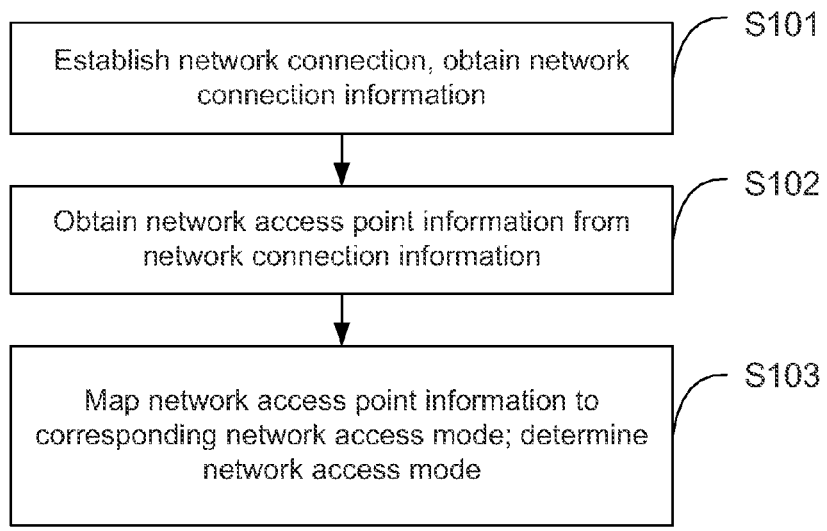
FIG. 1 is a flowchart of a method for obtaining network access mode implemented by an exemplary embodiment consistent with the present disclosure.

FIG. 1 shows a flow chart of a method for obtaining network access modes implemented by embodiments consistent with the present disclosure. The method shown in FIG. 1 includes steps S101-S103.

In step S101, a mobile device may establish a network connection to the Internet. A network service provider may obtain the network access mode from the data related to the network connection. The mobile device may be a mobile phone, a tablet computer, or other computing devices that can connect to the Internet. On the wireless Internet, mobile devices may connect to the network by various wireless links, such as blue tooth, Wi-Fi, 3G, or 2G connections. A network service provider may need to determine the network access mode of the mobile device so that it can provide the user with appropriate services. For example, a network service provider may issue mainly text based webpages, which do not consume much network resources, to 2G users. The network service provider may also issue webpages with more graphics to 3G or Wi-Fi users.

The network service provider may determine the network access mode based on access point information. The access point information may refer to a parameter that specifies the mode in which the mobile device accesses the network, such as the APN. Embodiments consistent with the present disclosure may obtain a network access mode from data related to a network connection and match the network access mode with data related to a mobile device's current network connections, and therefore improve the accuracy in determining the network access mode of the mobile device.

Once the mobile device connects to the Internet, the network service provider may obtain the access point information. If the data related to the network connection of the mobile device does not provide the access point information, the network service provider may further determine the network access mode based on the local network connection related to the mobile device, or the wireless gateway IP address.

For example, the network access mode of a mobile device may be a 2G/2.5G, 3G, or Wi-Fi/Wlan connection. Further, the network access mode may be a wireless network provided by a specific network service provider (i.e., a carrier).

The network access point information may include CTNET, CTWAP, 3GNET, 3GWAP, UNINET, UNIWAP, CMWAP, CMNET, Wi-Fi, Wlan, etc.

The network service provider may determine the network access mode of a mobile device based on a mapping table, such as the table shown below.

TABLE 1

| Network Access Point Information (APN) | Network Access Mode |
| --- | --- |
| CTNET, CTWAP | China Telecom 3G |
| 3GNET, 3GWAP | China Unicom 3G |
| UNINET, UNIWAP | China Unicom 2G |
| CMWAP, CMNET | China Mobile 2G |
| Wi-Fi, Wlan | Wi-Fi Connection |

As shown above, once the network service provider obtains the network access point information (e.g., APN) from the mobile device, it may look up which network access mode should be the mode for the mobile device's wireless connection. The network access modes listed in Table 1 are exemplary. The mapping of the network access point information (e.g., APN) with the network access modes may evolve with new development of technologies. For example, there will be APNs that will map to 4G network access modes. It is apparent that a network service provider may modify the mappings between the network access point information and the network access modes.

Embodiments consistent with the present disclosure may obtain a network access mode from data related to a network connection and match the network access mode with data related to a mobile device's current network connection, and therefore improve the accuracy in determining the network access mode of the mobile device.

Figure 2:
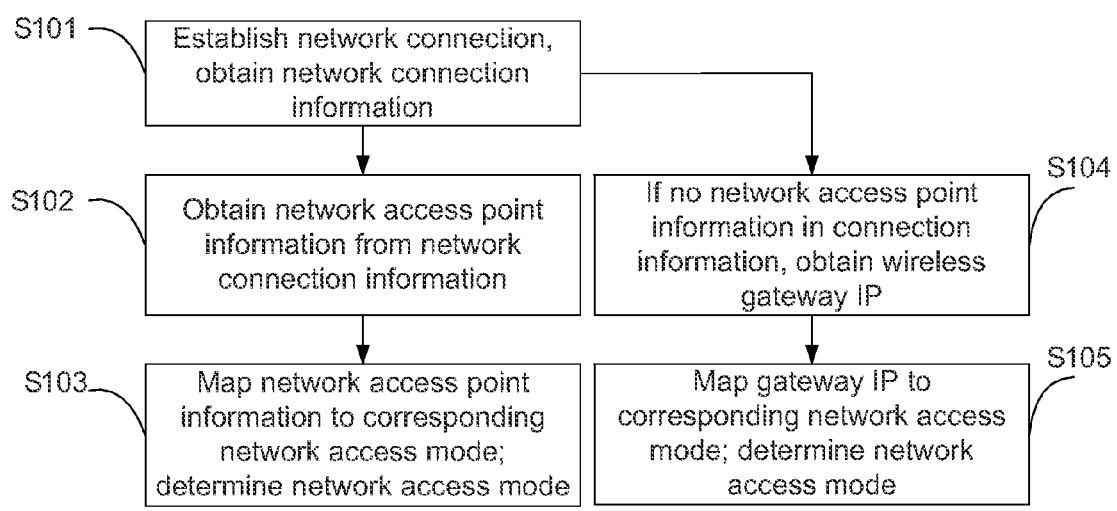
FIG. 2 is another flowchart of a method for obtaining network access mode implemented by an exemplary embodiment consistent with the present disclosure.

FIG. 2 shows another flow chart of a method for obtaining network access modes implemented by embodiments consistent with the present disclosure. In addition to the method described in relation to FIG. 1, the method shown in FIG. 2 further includes steps S104-S105.

In step S104, if the data related to the network connection do not provide the network access point information, the network service provider may obtain the wireless gateway IP address from the data related to the network connection. In step S105, the network service provider may determine the network access mode based on the segment of network in which the gateway IP resides.

In the example shown in FIG. 2, the network service provider may determine the network access mode even when the data related to the network connection do not provide network access point information. The network service provider may determine the network access mode based on the segment of network on which the gateway IP resides. For example, certain IP network segment may belong to one network service provider (e.g., China Mobile), and another IP network segment may belong to another network service provider (e.g., China Telecom).

Similar to the mapping table shown in Table 1, the network service provider may use a mapping table to map wireless gateway IP addresses to network access modes. Once the network service provider obtains the wireless gateway IP address of the mobile device, it may then look up the corresponding network access mode in the mapping table. Also similar to the example described in relation to Table 1, the mapping table for the wireless gateway IP addresses and the network access modes may be modified by the network service provider as needed.

Embodiments consistent with the present disclosure may obtain a network access mode from data related to a network connection and match the network access mode with data related to a mobile device's current network connection, and therefore improve the accuracy in determining the network access mode of the mobile device. In addition, if the network access mode cannot be obtained from the network connection, embodiments consistent with the present disclosure may use a gateway IP address to help determine the network access mode, and therefore, improve the accuracy in determining the network access mode of the mobile device.

Figure 3:
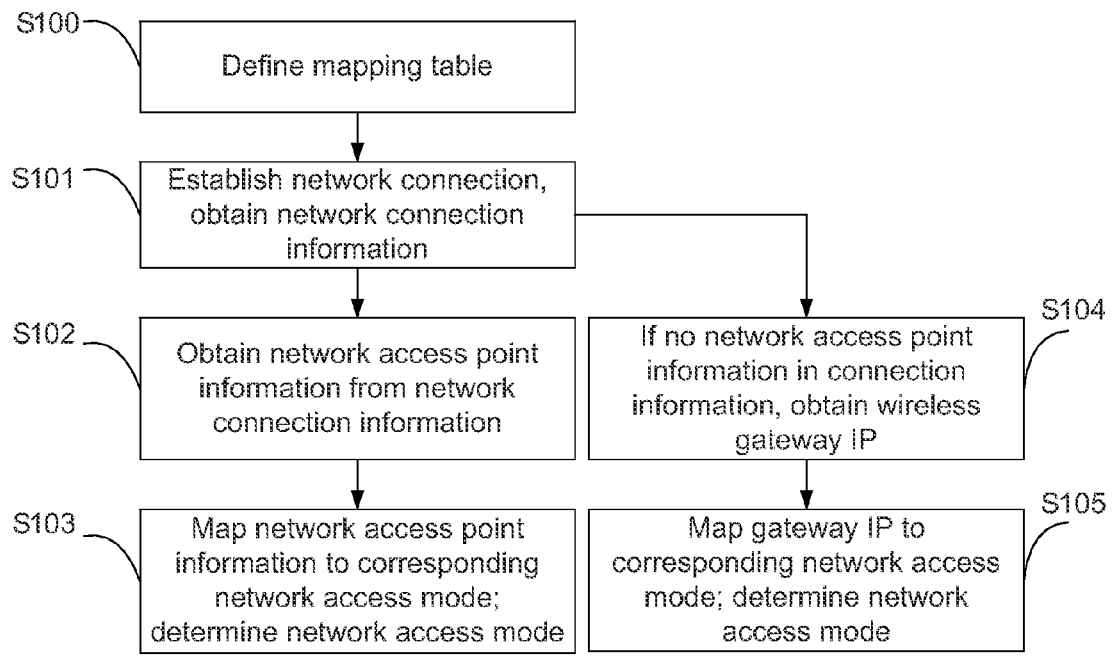
FIG. 3 is another flowchart of a method for obtaining network access mode implemented by an exemplary embodiment consistent with the present disclosure.

FIG. 3 shows another flow chart of a method for obtaining network access modes implemented by embodiments consistent with the present disclosure. In addition to the method described in relation to FIG. 2, the method shown in FIG. 3 further includes step S100. In step S100, the network service provider may define a mapping table. For example, as shown in Table 1, the mapping table may map network access point information, such as CTNET, CTWAP, 3GNET, 3GWAP, UNINET, UNIWAP, CMWAP, CMNET, Wi-Fi, Wlan, etc., to various network access modes, such as 2G/3G networks operated by different wireless network service providers. In another example, the mapping table may map the network segments for various wireless gateway IP addresses to network access modes, such as 2G/3G networks operated by different wireless network service providers.

Embodiments consistent with the present disclosure may obtain a network access mode from data related to a network connection and match the network access mode with data related to a mobile device's current network connection, and therefore improve the accuracy in determining the network access mode of the mobile device. In addition, if the network access mode cannot be obtained from the network connection, embodiments consistent with the present disclosure may use a gateway IP address to help determine the network access mode, and therefore, improve the accuracy in determining the network access mode of the mobile device. In addition, the mapping tables for the network access point information and for the wireless gateway IP address may be used in combination to determine the network access modes. That is, a network service provider may use both the network access point information and the wireless gateway IP address of a network connection to determine the network access mode of a wireless mobile device, thus improve the accuracy in determining the network access mode.

Figure 4:
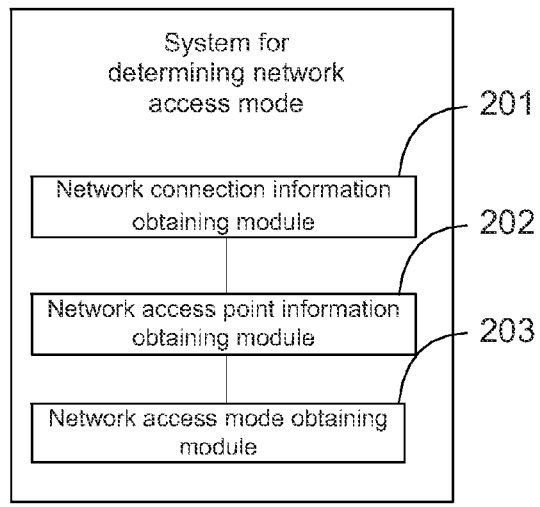
FIG. 4 is a schematic diagram of an exemplary system for obtaining network access mode consistent with the present disclosure.

FIG. 4 shows an exemplary schematic diagram of a system for determining network access mode consistent with the present disclosure. The exemplary system shown in FIG. 4 may be used to implement the method described in relation to FIG. 1. The system for determining network access mode may be included in a mobile device, or outside a mobile device. In FIG. 4, the system for determining network access mode is in the mobile device. As mentioned above, a mobile device may be a mobile phone, a tablet computer, or any computing devices that can be connected to the Internet.

The system for determining network access mode as shown in FIG. 4 may include a network connection information obtaining module 201, a network access point information obtaining module 202, and a network access mode obtaining module 203. Specifically, the network connection information obtaining module 201 may obtain information related to the network connection established by the mobile device. The network access point information obtaining module 202 may obtain the network access point information from the network connection information. The network access mode obtaining module 203 may match the network access point information with the corresponding network access mode using a mapping table, and determine the network access mode.

On the wireless Internet, mobile devices may connect to the network by various wireless connections, such as blue tooth, Wi-Fi, 3G, and 2G connections. A network service provider may need to determine the network access mode of the user so that it can provide the user with appropriate services. For example, a network service provider may issue mainly text based webpages which do not consume much network resources to 2G users. The network service provider may also issue webpages with more graphics which provide better user experiences to 3G or users.

The mobile device may determine the network access mode based on access point information. The access point information may refer to a parameter that specifies the mode in which the mobile device accesses the network (e.g., APN). Embodiments consistent with the present disclosure may obtain a network access mode from data related to a network connection and match the network access mode with data related to a mobile device's current network connection, and therefore improve the accuracy in determining the network access mode of the mobile device.

Once the mobile device connects to the Internet, the network access point information obtaining module 202 may obtain the access point information. If the data related to the network connection of the mobile device does not provide the access point information, the network access mode obtaining module 203 may further determine the network access mode based on the local network connection related to the mobile device, or the wireless gateway IP address.

For example, the network access mode of a connection may be a 2G/2.5G, 3G, Wi-Fi/Wlan network supported by a certain network service provider. The network access point information may include CTNET, CTWAP, 3GNET, 3GWAP, UNINET, UNIWAP, CMWAP, CMNET, Wi-Fi, Wlan, etc.

The network access mode obtaining module 203 may determine the network access mode of a mobile device based on a mapping table, such as the table shown in Table 1. As shown in Table 1, once the network access point information obtaining module 202 obtains the network access point information (e.g., APN) from the mobile device, the network access mode obtaining module 203 may look up which network access mode should be the mode for the mobile device's wireless connection. The network access modes listed in Table 1 are exemplary. The mapping of the network access point information (e.g., APN) with the network access modes may evolve with new development of technologies. For example, there will be new APN(s) that will map to 4G network access modes. It is apparent that a network service provider may modify the mappings between the network access point information and the network access modes.

Embodiments consistent with the present disclosure may obtain a network access mode from data related to a network connection and match the network access mode with data related to a mobile device's current network connection, and therefore improve the accuracy in determining the network access mode of the mobile device.

Figure 5:
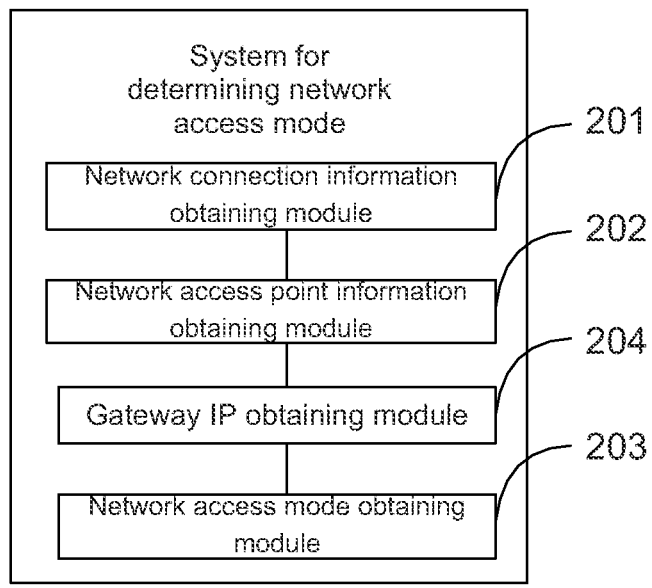
FIG. 5 is another a schematic diagram of an exemplary system for obtaining network access mode consistent with the present disclosure.

FIG. 5 shows an exemplary schematic diagram of a system for determining network access mode consistent with the present disclosure. The exemplary system shown in FIG. 5 may be used to implement the method described in relation to FIG. 2. The system for determining network access mode may be included in a mobile device, or outside a mobile device. In FIG. 5, the system for determining network access mode is in the mobile device. In addition to the modules described in relation to FIG. 4, the system shown in FIG. 5 further includes a gateway IP obtaining module 204.

If the data related to the network connection do not provide network access point information, the gateway IP obtaining module 204 may obtain the wireless gateway IP address from the data related to the network connection. The network access mode obtaining module 203 may determine the network access mode based on the segment of network in which the gateway IP resides.

In the example described in relation to FIG. 2, the network access mode obtaining module 203 may determine the network access mode even when there is not network access point information in the data related to the mobile device's network connection. Specifically, if the data related to the network connection do not provide network access point information, the network access mode obtaining module 203 may determine the network access mode based on the segment of network in which the gateway IP resides. For example, certain IP network segment may belong to one service provider (e.g., China Mobile), and another IP network segment may belong to another service provider (e.g., China Telecom).

Similar to the mapping table shown in Table 1, the network access mode obtaining module 203 may use a mapping table to map wireless gateway IP addresses to network access modes. Once the gateway IP obtaining module 204 obtains the wireless gateway IP address of the mobile device, the network access mode obtaining module 203 may then look up the corresponding network access mode in the mapping table. Also similar to the example related to Table 1, the mapping table for the wireless gateway IP addresses and the network access modes may be modified by the network service provider as needed.

Embodiments consistent with the present disclosure may obtain a network access mode from data related to a network connection and match the network access mode with data related to a mobile device's current network connection, and therefore improve the accuracy in determining the network access mode of the mobile device. In addition, if the network access mode cannot be obtained from the network connection, embodiments consistent with the present disclosure may use a gateway IP address to help determine the network access mode, and therefore, improve the accuracy in determining the network access mode of the mobile device.

Figure 6:
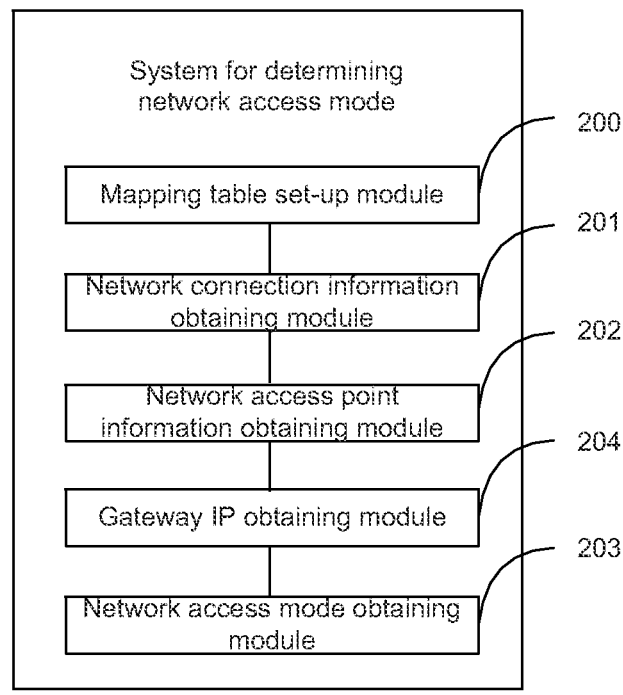
FIG. 6 is another a schematic diagram of an exemplary system for obtaining network access mode consistent with the present disclosure.

FIG. 6 shows an exemplary schematic diagram of a system for determining network access mode consistent with the present disclosure. The exemplary system shown in FIG. 6 may be used to implement the method described in relation to FIG. 3. The system for determining network access mode may be included in a mobile device, or outside a mobile device. In FIG. 6, the system for determining network access mode is in the mobile device. In addition to the modules described in relation to FIG. 5, the system shown in FIG. 5 further includes a mapping table set-up module 200. The mapping table set-up module 200 may define mapping tables for the system for determining network access mode.

The mapping table set-up module 200 may define a mapping table. For example, as shown in Table 1, the mapping table may map network access point information, such as CTNET, CTWAP, 3GNET, 3GWAP, UNINET, UNIWAP, CMWAP, CMNET, Wi-Fi, Wlan, etc., to various network access modes, such as 2G/3G networks operated by different wireless network service providers. In another example, a mapping table may map the network segments for various wireless gateway IP addresses to various network access modes, such as 2G/3G networks operated by different wireless network service providers.

Embodiments consistent with the present disclosure may obtain a network access mode from data related to a network connection and match the network access mode with data related to a mobile device's current network connection, and therefore improve the accuracy in determining the network access mode of the mobile device. In addition, if the network access mode cannot be obtained from the network connection, embodiments consistent with the present disclosure may use a gateway IP address to help determine the network access mode, and therefore, improve the accuracy in determining the network access mode of the mobile device. In addition, the mapping tables for the network access point information and for the wireless gateway IP address may be used in combination to determine the network access modes. That is, embodiments consistent with the present disclosure may use both the network access point information and the wireless gateway IP address of a network connection to determine the network access mode of a wireless mobile device, thus improve the accuracy in determining the network access modes.

Consistent with embodiments of the present disclosure, one or more non-transitory storage medium storing a computer program are provided to implement the system and method for determining network access modes. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems for obtaining network access modes may be implemented. For example, a network service provider may use a new APN for certain mobile devices without needing to set up a new network access mode. Using a mapping table, the network service provider may map the new APN to one of its existing network access modes. By managing the APNs and the network access modes using one or more mapping tables, the network service provider may offer the existing network access to a subset of new mobile devices while distinguishing those mobile devices from others.

In another example, a network service provider may use both the network access point information and the wireless gateway IP of a network connection to determine the network access mode. The network service provider may use two mapping tables to map the network access point information (e.g., Table 1) and the wireless gateway IPs (e.g., Table 2) to network access modes. In one example, a mobile device's network access point information and the wireless gateway IP address may both map to the same network access mode A. The network service provider may then determine that the network access mode A is the correct network access mode for the mobile device. In another example, a mobile device's network access point information may map to network access mode A, and the wireless gateway IP address may map to network access mode B. The network service provider may determine the correct network access mode based on results from looking up the two tables and other rules. For example, the system may define a rule that if network access point information maps to network access mode A, and the wireless gateway IP address maps to network access mode B, then network access mode C is the correct mode for the corresponding mobile device. By managing the APNs and the network access modes using one or more mapping tables, the network service provider may offer more flexibility in managing the network access modes of the mobile devices.

What is claimed is:

1. A method for obtaining network access mode of a mobile device, comprising:
   obtaining network connection information once a mobile device connects to a network;
   obtaining network access point information from the network connection information; and
   determining a network access mode corresponding to the network access point information;
   wherein the method further comprises:
   obtaining a wireless gateway IP address if the network connection information does not provide the network access point information; and
   determining the network access mode corresponding to the wireless gateway IP address.

2. The method according to claim 1, determining the network access mode further comprising:
   looking up the network access mode from a mapping table mapping the network access point information to the network access mode; and
   determining the network access mode of the mobile device.

3. The method according to claim 2, the method further comprising:
   defining the mapping table with the network access point information mapped to the network access mode.

4. The method according to claim 1, wherein the network access point information comprises one of: CTNET, CTWAP, 3GNET, 3GWAP, UNINET, UNIWAP, CMWAP, CMNET, Wi-Fi, and WLAN.

5. The method according to claim 1, determining the network access mode further comprising:
   looking up the network access mode from a mapping table mapping the wireless gateway IP address to the network access mode; and
   determining the network access mode of the mobile device.

6. The method according to claim 1, further comprising:
   obtaining a wireless gateway IP address after obtaining the network access point information from the network connection information; and determining the network access mode corresponding to the network access point information and the wireless gateway IP address.

7. The method according to claim 6, determining the network access mode further comprising:
   looking up the network access mode from a mapping table mapping the wireless gateway IP address to a first network access mode and mapping the network access point information to a second network access mode; and
   determining the network access mode of the mobile device based on the first and second network access modes.

8. A system for obtaining a network access mode of a mobile device, comprising:
   a network connection information obtaining module configured to obtain network connection information once a mobile device connects to a network;
   a network access point information obtaining module configured to obtain network access point information from the network connection information; and
   a network access mode obtaining module configured to determine a network access mode corresponding to the network access point information;
   wherein the system further comprises:
   a gateway IP obtaining module configured to obtain a wireless gateway IP address if the network connection information does not provide the network access point information;
   wherein the network access mode obtaining module determines the network access mode corresponding to the wireless gateway IP address.

9. The system according to claim 8, wherein the network access mode obtaining module is further configured to look up the network access mode from a mapping table mapping the network access point information to the network access mode; and to determine the network access mode of the mobile device.

10. The system according to claim 9, the system further comprising:
   a mapping table set-up module configured to define the mapping table with the network access point information mapped to the network access mode.

11. The system according to claim 8, wherein the network access point information comprises one of: CTNET, CTWAP, 3GNET, 3GWAP, UNINET, UNIWAP, CMWAP, CMNET, Wi-Fi, and WLAN.

12. The system according to claim 8, wherein the network access mode obtaining module is further configured to look up the network access mode from a mapping table mapping the wireless gateway IP address to the network access mode; and to determine the network access mode of the mobile device.

13. The system according to claim 8, wherein the network access mode obtaining module is further configured to obtain a wireless gateway IP address after obtaining the network access point information from the network connection information; and to determining the network access mode corresponding to the network access point information and the wireless gateway IP address.

14. The system according to claim 13, wherein the network access mode obtaining module is further configured to look up the network access mode from a mapping table mapping the wireless gateway IP address to a first network access mode and mapping the network access point information to a second network access mode; and to determine the network access mode of the mobile device based on the first and second network access modes.

15. A method for obtaining network access mode of a mobile device, comprising:
   obtaining network connection information once a mobile device connects to a network;
   obtaining network access point information from the network connection information;
   obtaining a wireless gateway IP address from the network connection information; and
   determining a network access mode corresponding to the network access point information and the wireless gateway IP address;
   wherein the method further comprises:
   obtaining the wireless gateway IP address if the network connection information does not provide the network access point information; and
   determining the network access mode corresponding to the wireless gateway IP address.

* * * * *